(12) United States Patent
Heikes et al.

(10) Patent No.: US 7,386,798 B1
(45) Date of Patent: Jun. 10, 2008

(54) SHARING ON-LINE MEDIA EXPERIENCES

(75) Inventors: Brian Heikes, Ashburn, VA (US); William Frischling, Great Falls, VA (US); John Thomas Love, Sterling, VA (US)

(73) Assignee: AOL LLC, Dulles, VA (US)

( * ) Notice: Subject to any disclaimer, the term of this patent is extended or adjusted under 35 U.S.C. 154(b) by 856 days.

(21) Appl. No.: 10/330,552

(22) Filed: Dec. 30, 2002

(51) Int. Cl.
*G06F 7/00* (2006.01)
*G06F 15/16* (2006.01)

(52) U.S. Cl. .................................. 715/752; 715/758

(58) Field of Classification Search ......... 715/719–721, 715/723, 722–726, 748–749, 727, 738, 753, 715/811, 745, 752, 758; 709/205, 204, 227; 725/135, 143; 707/104.1; 705/10
See application file for complete search history.

(56) References Cited

U.S. PATENT DOCUMENTS

| 6,308,175 | B1 | 10/2001 | Lang et al. |
| 6,529,949 | B1 | 3/2003 | Getsin et al. |
| 7,133,896 | B2* | 11/2006 | Ogdon et al. ............... 709/205 |
| 2002/0002569 | A1* | 1/2002 | Nguyen et al. ............... 707/515 |
| 2002/0023132 | A1* | 2/2002 | Tornabene et al. ........... 709/205 |
| 2002/0038293 | A1* | 3/2002 | Seiden .......................... 705/80 |
| 2002/0087348 | A1* | 7/2002 | Decatur .......................... 705/1 |
| 2003/0009367 | A1* | 1/2003 | Morrison ........................ 705/9 |
| 2003/0014483 | A1* | 1/2003 | Stevenson et al. ........... 709/203 |
| 2003/0032409 | A1* | 2/2003 | Hutcheson et al. ........... 455/414 |
| 2003/0149600 | A1* | 8/2003 | Williams ........................ 705/5 |
| 2003/0182428 | A1* | 9/2003 | Li et al. ....................... 709/227 |
| 2003/0225834 | A1* | 12/2003 | Lee et al. ..................... 709/204 |
| 2004/0082831 | A1* | 4/2004 | Kobashikawa et al. ........ 600/38 |
| 2004/0088169 | A1* | 5/2004 | Smith et al. .................. 704/500 |
| 2004/0103427 | A1* | 5/2004 | Fritsche et al. ................. 725/9 |
| 2004/0172415 | A1* | 9/2004 | Messina et al. ........... 707/104.1 |
| 2004/0249846 | A1* | 12/2004 | Randall et al. ............... 707/102 |
| 2005/0010470 | A1* | 1/2005 | Marino ........................ 705/10 |
| 2005/0198176 | A1* | 9/2005 | Landesmann ............... 709/206 |
| 2005/0222846 | A1* | 10/2005 | Tomes ........................ 704/275 |
| 2006/0116982 | A1* | 6/2006 | Samn ............................ 707/2 |

\* cited by examiner

*Primary Examiner*—Steven Sax
(74) *Attorney, Agent, or Firm*—Fish & Richardson P.C.

(57) ABSTRACT

A lead user may share an on-line media content experience with one or more followers by identifying content of interest being experienced on the lead user system, identifying one or more followers with whom to share the content of interest, inviting the followers to experience the content of interest, and enabling the followers to access the content of interest.

63 Claims, 15 Drawing Sheets

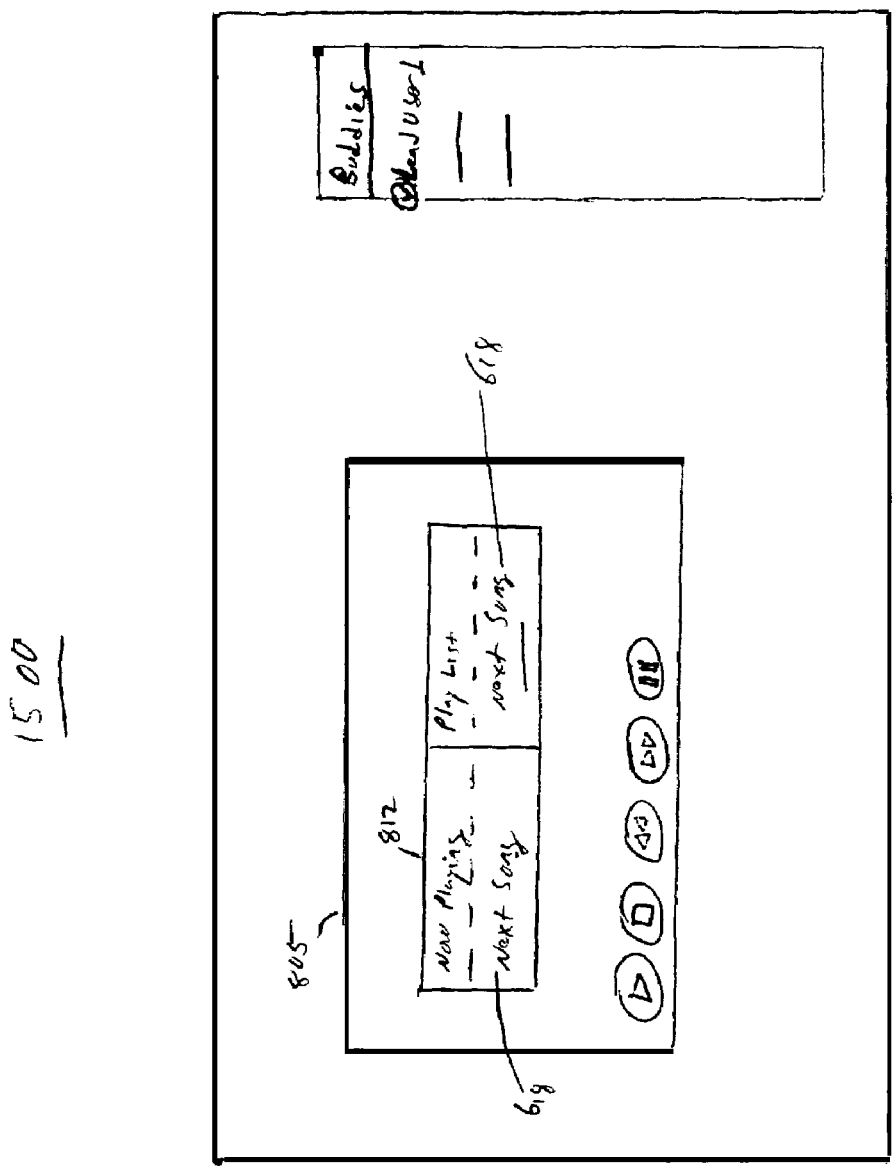

SHARING ON-LINE MEDIA EXPERIENCES

TECHNICAL FIELD

This description relates to on-line media experiences and more particularly to sharing on-line media experiences.

BACKGROUND

On-line service providers facilitate access to information and services, allowing users to navigate to desired resources, including on-line media content.

SUMMARY

In one general aspect, a lead user may share an on-line media content experience with one or more followers by identifying content of interest being experienced on the lead user system, identifying one or more followers with whom to share the content of interest, inviting the followers to experience the content of interest, and enabling the followers to access the content of interest.

Implementations may include one or more of the following features. For example, the content of interest may be identified by detecting streaming media content being experienced on the lead user system. The content of interest may be automatically identified, and an indication may be received that content of interest is being experienced on the lead user system.

Identifying the content of interest may also include identifying a change in the content of interest being experienced on the lead user system. The lead user system or the host system may automatically identify the change in content. For example, an indication may be received that changed content of interest is being experienced on the lead user system.

Identifying one or more followers includes selecting the one or more followers from a list of followers. For example, one or more followers may be selected based on a matching between the content and interests of the follower. The follower may be selected at the lead user system or the host system.

Also, one or more updated followers with whom to share changed content of interest may be identified. Updated followers may be identified based on a matching between the changed content and interests of the updated followers. Further, updated followers may be identified at the lead user system or the host system.

Generating the invitation includes generating a personalized invitation for one or more of the followers. The invitation may be generated automatically at the lead user system or by the host system. The invitation may be sent by, for example, an instant message, a chat room, or an e-mail message. Also, the invitation may be sent without user intervention in a machine-to-machine communication.

The followers may be enabled to access the content of interest automatically based upon a machine-to-machine communication without intervention by the follower. The updated followers may also be enabled to access changed content of interest. For example, updated followers may be enabled to automatically access the changed content based upon a machine-to-machine communication without intervention by the follower.

An indication of acceptance of the invitation by the followers may be received. Also or alternatively, an indication may be provided to the lead user of whether the followers are experiencing the on-line media experience of the lead user, and/or an indication may be provided to the follower of whether the follower is sharing the on-line media experience of the lead user. Further, an indication may be provided to the lead user of whether the updated followers are experiencing the changed content of the on-line media experience of the lead user, and an indication may be provided to the updated follower of whether the updated follower is sharing the changed content of the on-line media experience of the lead user.

Aspects of the shared on-line media experiences may be implemented by an apparatus and/or by a computer program stored on a computer readable medium. The computer readable medium may comprise a disc, a client device, a host device, and/or a propagated signal. In addition, aspects of the shared on-line media experiences may be implemented in a client/host context or in a standalone or offline client device.

Other features will be apparent from the following description, including the drawings, and from the claims.

DESCRIPTION OF DRAWINGS

FIGS. 6-11 and 13-15 are illustrations of different graphical user interfaces that may be implemented by systems such as those of FIGS. 1-4 when executing processes such as those of FIGS. 5 and 12.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or may be dedicated to a particular geographic region.

DETAILED DESCRIPTION

A user (e.g., a lead user) may desire to share with one or more other users (e.g., followers) various on-line media content experiences, such as viewing images and listening to sounds which may be made available by accessing on-line streaming media content or otherwise. The lead user may send one or more followers an invitation to experience the same on-line media content that the lead user is experiencing. The invitation may include a uniform resource locator (URL) or other identifier that is associated with the online media being experienced at the lead user, enabling relatively easy acceptance by a recipient follower. The invitation may be delivered to the recipient follower using a communications application or protocol such as, for example, instant messaging, chat, or e-mail. The invitation may be sent manually by the lead user or the invitation may be sent automatically by the lead user or by a host system. In an example of automatic operation, the invitation may be sent automatically by the lead user or by a host system when a match is detected between the interests of one or more followers and the content type of the on-line media being experienced by the lead user. If the invitation is accepted by a follower, the on-line media content being experienced by the lead user also is experienced by the follower. Thereafter, if the on-line media being experienced by the lead user changes to different on-line media content, a change notification will be sent from the lead user system to the follower system. Based on this notification, the follower system may change such that the follower will experience the new on-line media content being experienced by the lead user, either without follower input in response to the notification or with follower input that is elicited based on the notification.

Figure 1:
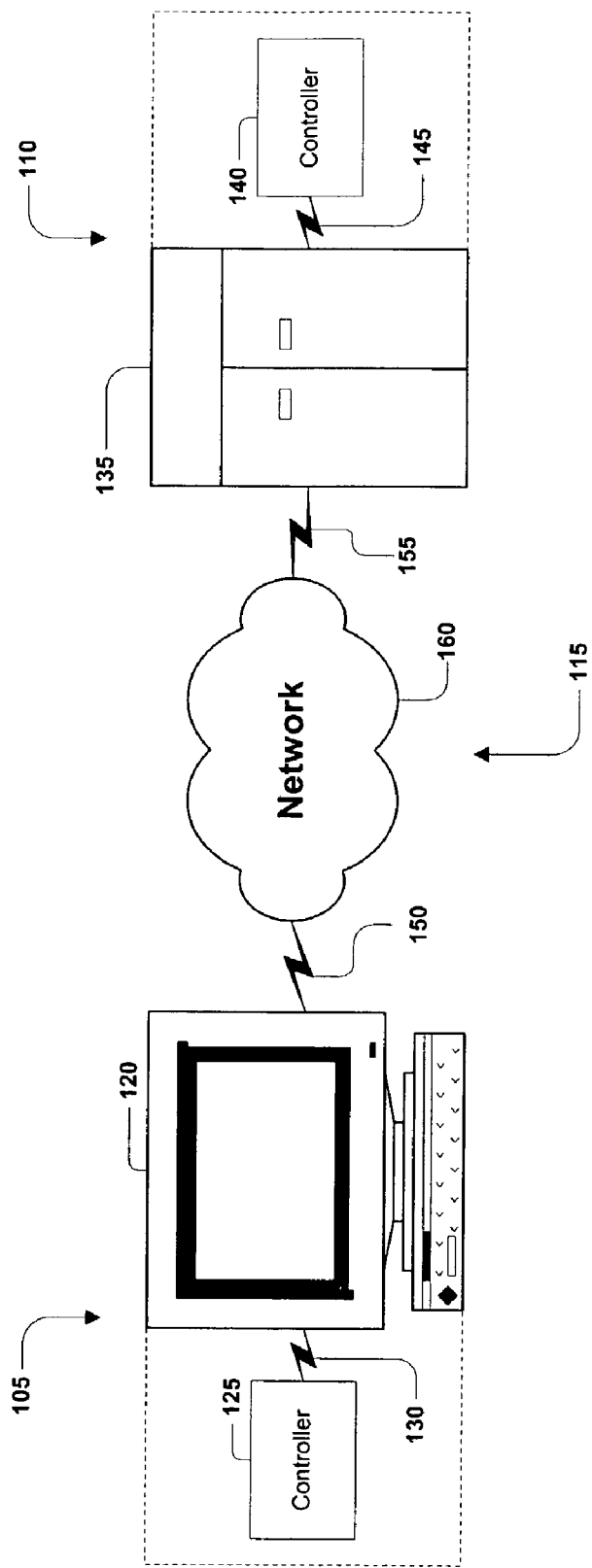
FIGS. 1-4 are block diagrams of an exemplary communications system.
Figure 2:
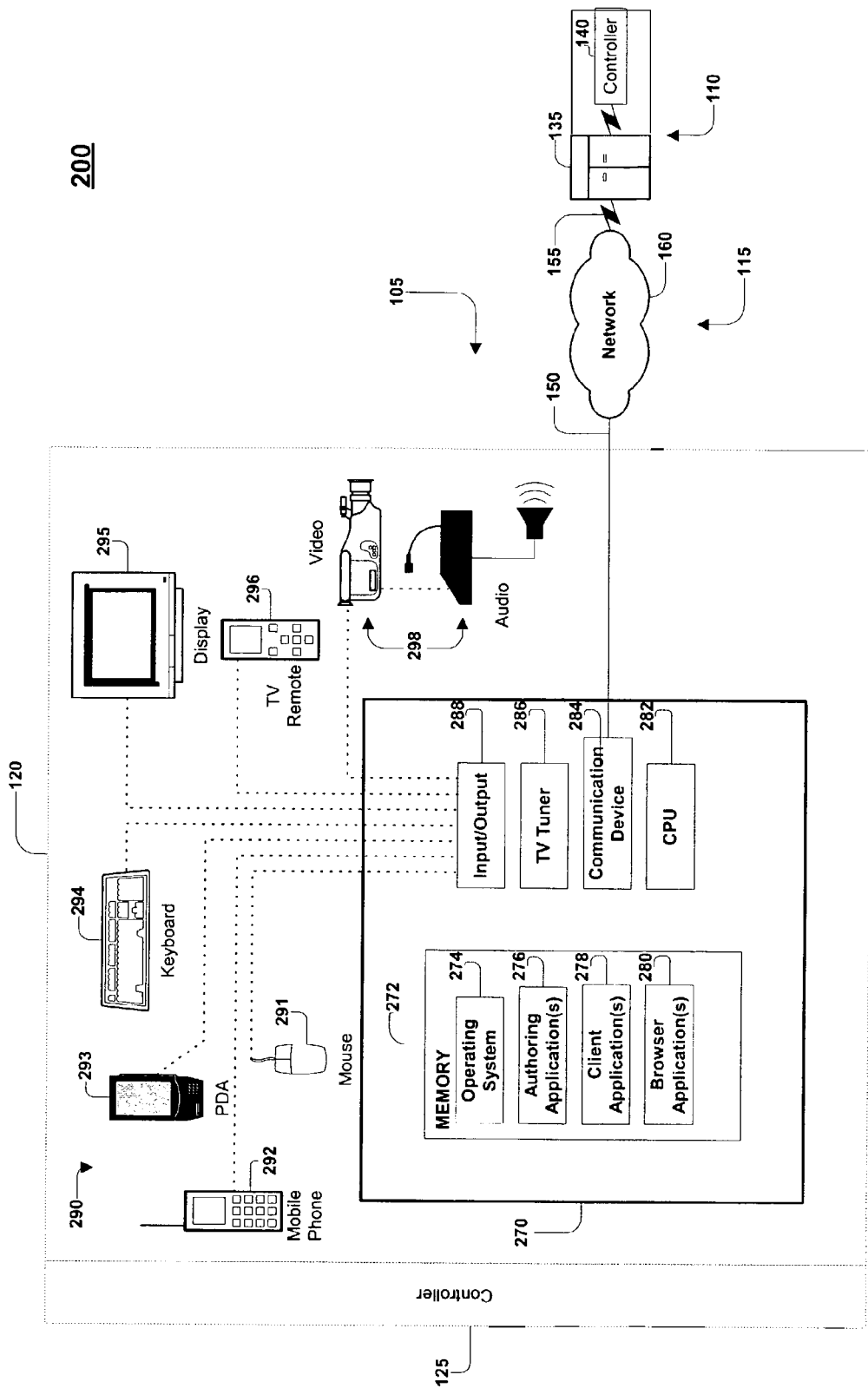

For illustrative purposes, FIGS. 1 and 2 show an example of a communications system for implementing techniques for transferring electronic data.

Referring to FIG. 1, a communications system 100 is capable of delivering and exchanging data between a client system 105, including a lead user system or a follower system, and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 generally are capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 that provides direct or indirect communication between the client system 105 and the host system 110, irrespective of physical separation. Examples of a delivery network 160 include the Internet; the World Wide Web; WANs; LANs; analog or digital wired and wireless telephone networks (e.g., Public Switched Telephone Network (PSTN), Integrated Services Digital Network (ISDN), and Digital Subscriber Line (xDSL)); radio, television, cable, or satellite systems; and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including a client system 105 communicating with a host system 110 through a communications link 115. The client system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, an interactive television (ITV) client, an internet service provider (ISP) client, or an instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

Several communications applications and protocols, such as instant messaging or chat, may be used by communications system 200. Typically, instant messaging (IM) communications involve an instantaneous or nearly instantaneous communication between two users, where each user is able to transmit, receive and display communicated information. Additionally, IM communications involve the display and perception of on-line presence information regarding other selected users ("buddies"). The IM communications may be machine-to-machine communications that occur without intervention by or communication through an instant messaging server after a communication session is established or authentication is performed. Examples of IM communications exist over AIM (America Online Instant Messenger), AOL (America Online) Buddy List and Instant Messages, Yahoo Messenger, MSN Messenger, and ICQ, among others. Although some examples of sharing on-line media experiences are discussed below using IM applications, other implementations provide similar functionality in platforms and on-line applications such as chat or e-mail.

Chat communications typically involve an instantaneous or nearly instantaneous communication between two or more users in a "chat room," where each user is able to transmit, receive and display communicated information. Additionally, chat communications may involve the display and perception of on-line presence information regarding other selected participants in the chat room. However, chat communications may occur in the absence of on-line presence information. The chat communications may be machine-to-machine communications that occur without intervention by or communication through a chat server after a communication session is established or authentication is performed. Examples of chat communications exist over AOL (America Online) and CompuServe, among others.

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, other implementations may have such devices themselves include the functionality of the general-purpose computer 270 and operate as the client device 120. For example, the mobile phone 292 or the PDA 293 may include computing and networking capabilities and may function as a client device 120 by accessing the delivery network 160 and communicating with the host system 110. Furthermore, the client system 105 may include one, some or all of the components and devices described above.

Figure 3:
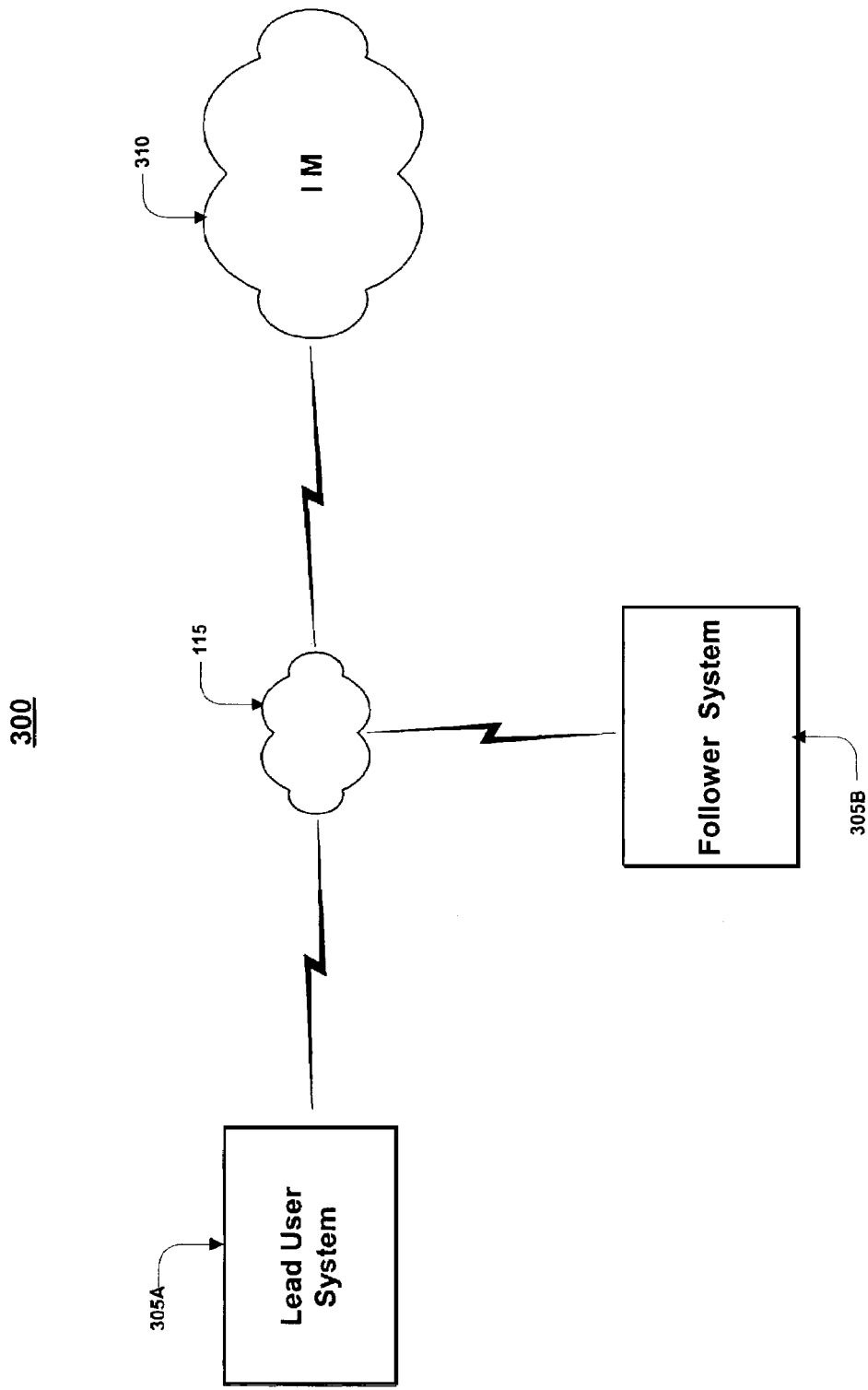

FIG. 3 illustrates a communications system 300 including a lead user system 305A communicating with a follower system 305B and an IM host system 310 through a communication link 115. Such a communications system 300 may be available to users of IM service providers, such as, for example, AIM, ICQ, Yahoo Messenger, and Microsoft Messenger.

The IM host system 310 may have characteristics similar to those described above with respect to the host system 110, the lead user system 305A and the follower system 305B have characteristics similar to those described above with respect to the client system 105, and the lead user system 305A and the follower system 305B include communication software to enable users of the client systems to access the IM host system 310.

The IM host system 310 may support IM services irrespective of a lead user's network or Internet access. Thus, the IM host system 310 may allow users to send and receive IMs, regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

To access the IM host system 310 to begin an IM session in the implementation of FIG. 3, the lead user system 305A establishes a connection to the IM host system 310. Once a connection to the IM host system 310 has been established, the lead user system 305A may directly or indirectly transmit data to and access content from the IM host system 310. By accessing the IM host system, a lead user can use the IM client application to view whether particular users ("buddies") are on-line, exchange IMs with particular buddies, participate in group chat rooms, trade files such as pictures, invitations or documents, find other buddies with similar interests, get customized information such as news and stock quotes, and search the Web. Follower system 305B may be similarly manipulated to establish contemporaneous connection with IM host system 310.

Once connectivity is established, a lead user who is using lead user system 305A views whether a follower using follower system 305B is on-line and able to receive IMs. If the follower is on-line, the lead user may exchange IMs with the follower.

In one implementation, the IMs sent between lead user system 305A and follower system 305B are routed through IM host system 310. In another implementation, the IMs sent between lead user system 305A and follower system 305B are routed through a third party server (not shown), and, in some cases, also are routed through IM host system 310. In yet another implementation, the IMs are sent directly between lead user system 305A and follower system 305B.

Figure 4:
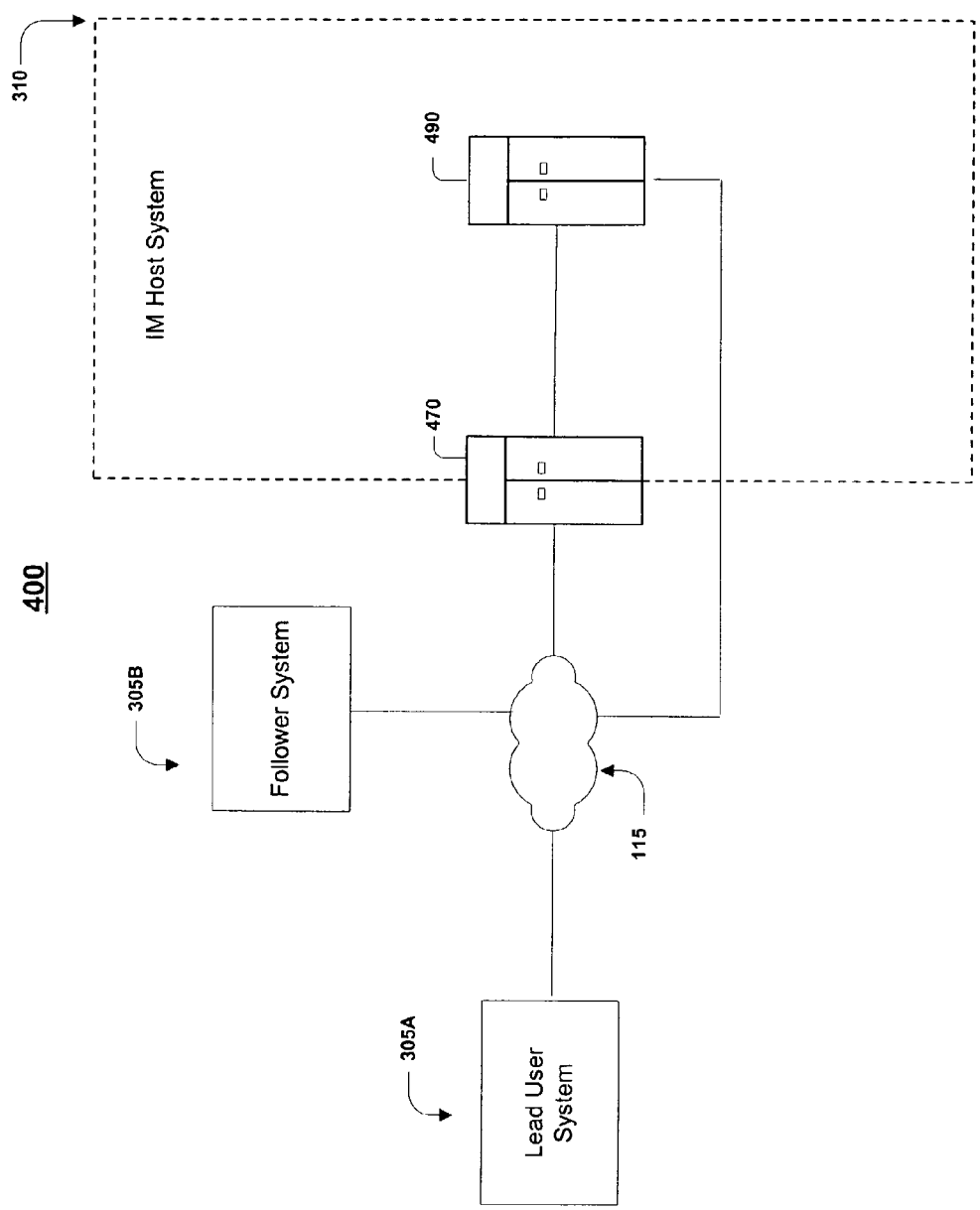

FIG. 4 illustrates a communications system 400 including a lead user system 305A communicating with a follower system 305B and an IM host system 310 through a communication link 115. System 400 illustrates a possible implementation of the communications system 300 of FIG. 3.

In system 400, the IM host system 310 includes a login server 470 for enabling access by users and routing communications between the lead user system 305A, the follower system 305B, and other elements of the IM host system 310. The IM host system 310 also includes an IM server 490. To enable access to and facilitate interactions with the IM host system 310, the lead user system 305A and the follower system 305B may include communication software, such as, for example, an OSP client application and/or an IM client application.

As described with respect to FIG. 3, the IM host system 310 may support IM services irrespective of a lead user's network or Internet access. Thus, the IM host system 310 may allow users to send and receive IMs regardless of whether they have access to any particular ISP. The IM host system 310 also may support associated services, such as administrative matters, advertising, directory services, chat, and interest groups related to the IM. The IM host system 310 has an architecture that enables the devices (e.g., servers) within the IM host system 310 to communicate with each other. To transfer data, the IM host system 310 employs one or more standard or exclusive IM protocols.

The lead user system 305A may establish a connection to the login server 470 in order to access the IM host system 310 and begin an IM session. The login server 470 typically determines whether the particular lead user is authorized to access the IM host system 310 by verifying the lead user's identification and password. If the lead user is authorized to access the IM host system 310, the login server 470 usually employs a hashing technique on the lead user's screen name to identify a particular IM server 490 within the IM host system 310 for use during the lead user's session. The login server 470 provides the lead user system 305A with the IP address of the IM server 490, gives the lead user system 305A an encrypted key, and breaks the connection. The lead user system 305A then uses the IP address to establish a connection to the particular IM server 490 through the communications link 115, and uses the encrypted key to obtain access to the IM server 490. Typically, the lead user system 305A is able to establish an open TCP connection to the IM server 490. The follower system 305B establishes a connection to the IM host system 310 in a similar manner.

In one implementation, the lead user system 305A may directly or indirectly transmit data to and access content from the IM server 490 once a connection to the IM server 490 has been established. By accessing the IM server, a lead user can leverage the IM client application to determine whether particular users ("buddies" or potential followers) are on-line, exchange IMs with particular buddies, participate in group chat rooms, trade files such as pictures, invitations or documents, find other buddies with similar interests, get customized news and stock quotes, and search the Web. For example, a lead user who is using lead user system 305A may view whether a buddy using follower system 305B is on-line, and if so, may exchange IMs with that buddy.

The IMs sent between lead user system 305A and follower system 305B may be routed through IM host system 310, routed through a third party server (not shown, or the IMs may be sent directly between lead user system 305A and follower system 305B.

The IM host system 310 may include a user profile server (not shown) connected to a database (not shown) for storing large amounts of user profile data. The user profile server may be used to enter, retrieve, edit, manipulate, or otherwise process user profile data. In one implementation, a user's profile data includes, for example, the user's screen name, buddy list, geographic location, and identified interests, including interests in various categories of on-line media. The lead user or the follower may enter, edit and/or delete profile data using an installed IM client application on the lead user system 305A or on the follower system 305B to interact with the user profile server.

Because the user's data are stored in the IM host system 310, the lead user and the follower do not have to reenter or update such information in the event that the lead user or the follower accesses the IM host system 310 using a new or different lead user system 305A or follower system 305B. Accordingly, when, for example, the lead user accesses the IM host system 310, the IM server 490 can instruct the user profile server to retrieve the lead user's profile data from the database and to provide, for example, the lead user's buddy list to the IM server 490. Alternatively, user profile data may be saved locally on the lead user system 305A.

Systems similar to those shown by FIGS. 3 and 4 may be used to enable similar functionality with respect to non-IM communications schemes, for example, such as the typed described with respect to FIG. 2.

Figure 5:
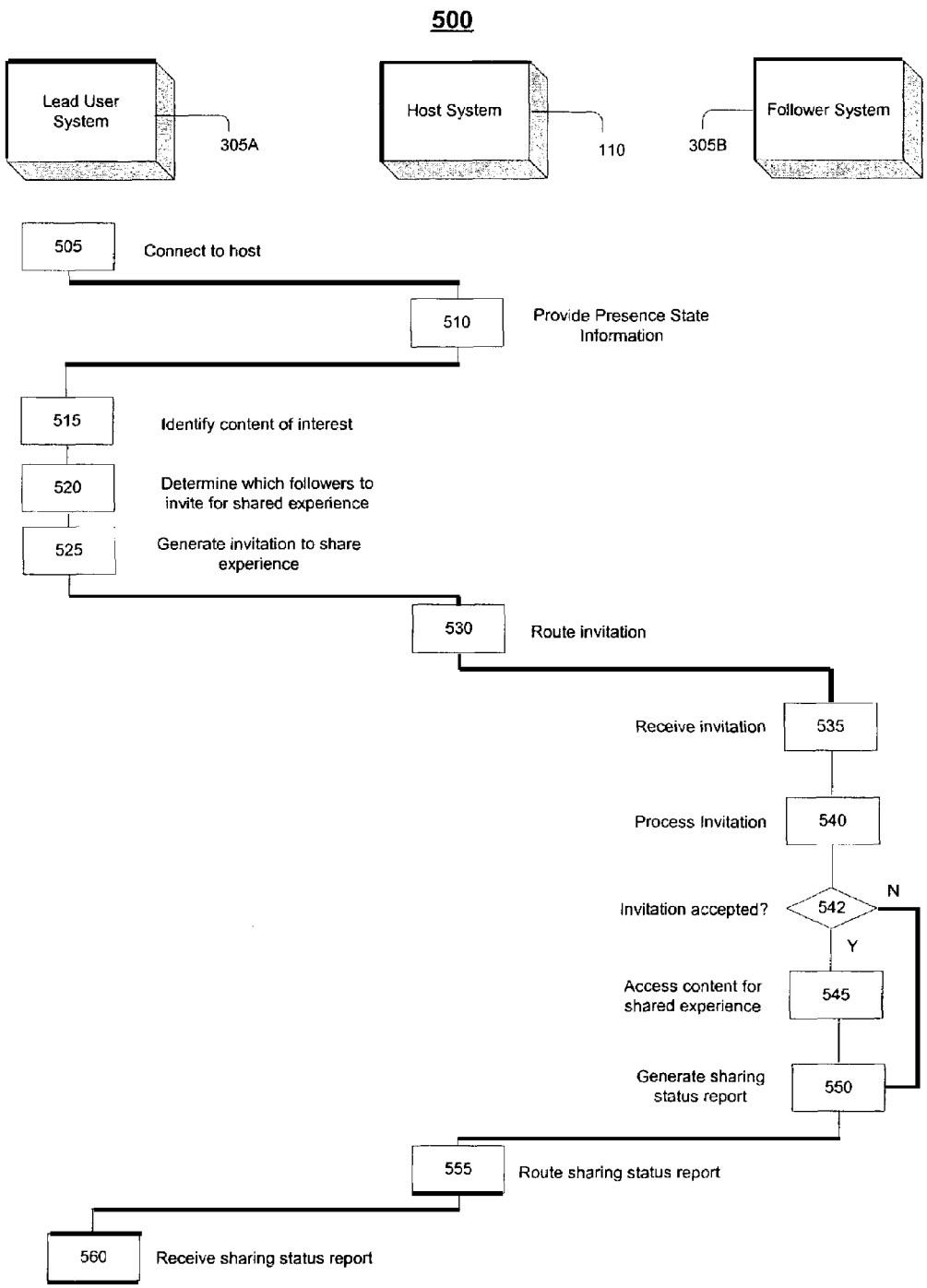
FIGS. 5 and 12 are flow charts of exemplary processes that may be implemented by systems such as those of FIGS. 1-4.
Figure 12:
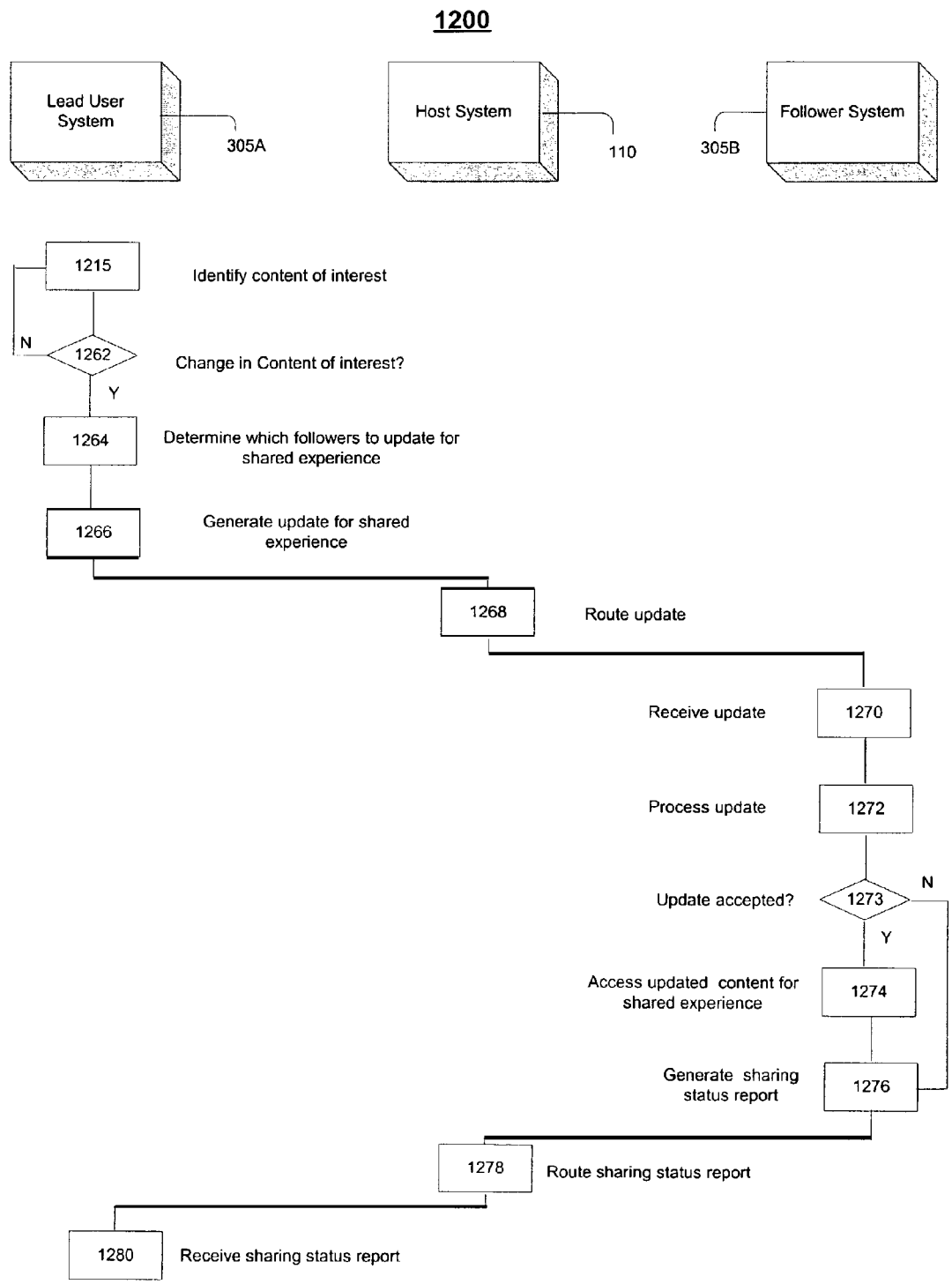

Referring to FIGS. 5 and 12, the lead user system 305A, the follower system 305B, and the host system 110 interact according to exemplary procedures 500 and 1200 to share the on-line media content experiences of a lead user with one or more followers. The procedures 500 and 1200 may be implemented by any type of hardware, software, device, computer, computer system, equipment, component, program, application, code, storage medium, or propagated signal. Furthermore, although not shown in FIGS. 5 and 12, the lead user system 305A, the follower system 305B, and the host system 110 may be directly or indirectly interconnected through known or described delivery networks, examples of which are described with respect to network 160. The procedures 500 and 1200 may be implemented in a client/host context, or a standalone or offline client context. The on-line media content experiences may be shared by the standalone/offline device and may be accessed or updated through a remote device in a non-client/host environment, such as, for example, a LAN server serving an end user or a mainframe serving a terminal device. Thus, the procedures 500 and 1200 described below may be implemented for an OSP, ISP, browser and/or other software program, such as programs for playing on-line media (media players), instant messaging, chat, electronic mail and stand-alone browsers.

Procedures 500 and 1200 generally involve sharing on-line media content experiences of a lead user with one or more followers. While some functions of procedures 500 and 1200 may be performed entirely by the lead user system 305A or the follower system 305B, other functions may be performed by the host system 110 or the collective operation of the lead user system 305A, the follower system 305B, and/or the host system 110. The host system 110 may be, for example an IM host system 310.

Referring to FIG. 5, in the procedure 500, the lead user system 305A and the host system 110 are physically and/or logically connected (step 505). For instance, lead user system 305A may connect to the host system 110 across a network (e.g., network 160) by supplying a lead user identification and password to a server (e.g., a login server) in order to obtain access to the host system 110.

One or more presence states or state changes is provided by the host system 110 to the lead user system 305A for each of several followers designated by the lead user (step 510). In an IM context, followers may be designated by the lead user by including them on a buddy list. For the designated followers, the host system 110 detects the login state or a change in login state, such as, for example, when a follower signs out, is inactive for a period of time, becomes active after having been inactive for a period of time, indicates an ability to receive instant messages, or indicates an inability to receive instant messages. The host system 110 also may store and update the presence state of the designated followers, and further may provide updated presence state information to the lead user system 305A.

On-line media content being experienced (i.e., being played or otherwise being made perceptible to the user) on the lead user system 305A then is identified (step 515). The on-line media content may be identified manually by the lead user, for example, by the lead user experiencing on-line media content played on the lead user system 305A. The on-line media content may also be identified automatically by the lead user system 305A or may be identified automatically by the host system 110. For example, the host system may be provided with an indication that on-line media content of interest is being experienced on the lead user system 305A, or the host system may be provided with the identity of the content being experienced on the lead user system 305A and the host systems may make a determination as to whether that content is content of interest.

The on-line media content being experienced on the lead user system 305A may be rendered through an application program such as a media player or a web browser. As discussed above, it may include images and sounds, including streaming images and sounds, such as, for example, photographs, audio content, and video content. Also, as discussed above, a uniform resource locater (URL) or another identifier may be associated with the on-line media content to assist a user in locating and accessing the media content.

Figure 6:
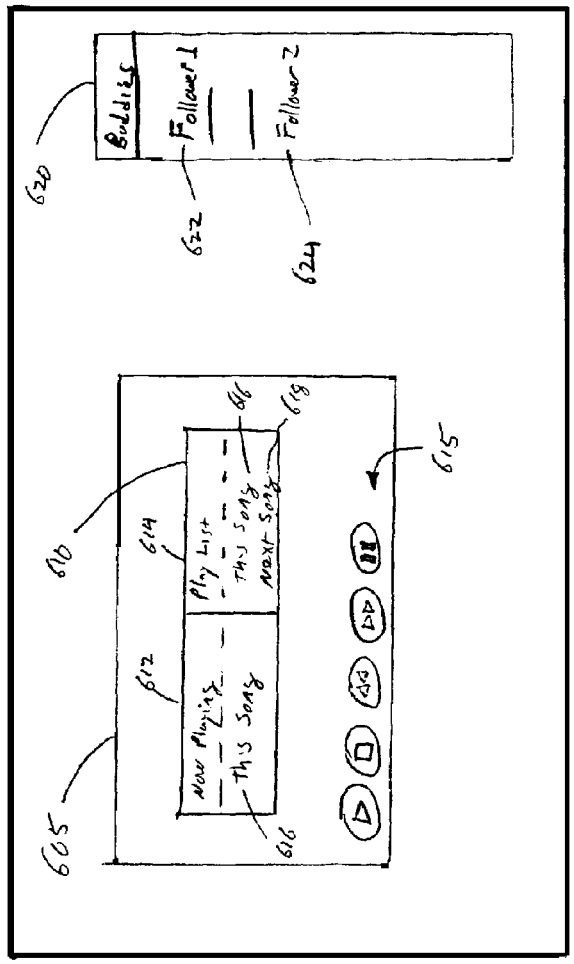

FIG. 6 illustrates one particular scenario in which an application can be used as a basis for identifying on-line media content of interest. In particular, FIG. 6 illustrates one example of a user interface (UI) 600 that may be presented to a lead user for enabling the lead user to experience on-line media content. The UI 600 includes a media player 605 configured to access the on-line media content and make it perceivable to the lead user. In general, the UI 600 is rendered on the lead user system 305A using software stored on the lead user system 305A. The on-line media content to be experienced by the lead user may be stored on the lead user system 305A, on the host system 110, or on a different host system 110, such as a host system of an authorized partner or on a server accessible through the Internet.

As shown, the media player 605 includes a window 610 that displays the on-line media content currently being experienced 612 and a play list of media content 614 that may include content previously experienced, content currently being experienced, and content scheduled to be experienced in the future. In the example of FIG. 6, the media content currently being experienced 612 is a song 616, and the play list includes the song 616 currently being experienced and a different song 618 scheduled to be experienced next. The media play 605 also includes controls 615 for enabling the user to control the experience of the on-line content, such as controls for starting, stopping, fast forwarding, and rewinding the content.

The UI 600 also includes a list of followers 620, and the lead user may wish to share the on-line media content experience with one or more of the followers on the list of followers 620. As show, the list of followers 620 is a buddy list in an instant messaging context, and shows at least two buddies currently on-line, Follower1 622 and Follower2 624.

As discussed above, on-line media content of interest may be automatically identified by the lead user system 305A, and may be associated with a category from a predefined list of categories. For example, the lead user system may identify the playing of a song 616 by a media player 605 running on the lead user system. The song 616 may have an associated first URL that is used by the media player 605 to retrieve the song 616 and play the song 616 for the lead user. The song may be classified in a category (i.e., music), and may also be further classified in other categories such as entertainment or sub-categories such as classical, jazz, country or rock music. The on-line media content may be categorized, for example, by the lead user, by a follower, by the host system 110, a host other than host system 110, or by another user or device. In one implementation, the content of interest being experienced is reported to the host system 110 by the lead user system 305A. The host system 110 may store the content being experienced by the lead user in a data store, along with tracking information for any category or subcategory thereafter.

Next, an identification is made, from a list of followers, as to which followers will be selected to share the on-line media content experience of the lead user (step 520). In one implementation, the identification is made manually by the lead user. For example, the lead user may select a buddy from a buddy list. In another implementation, the identification may be made automatically by the lead user system 305A or the host system 110. For example, the identification may be made based upon a matching between a list of followers designated by the lead user and known interests of the designated followers. Also, the identification may be made on-the-fly by the lead user, by the lead user system, or by the host.

Figure 7:
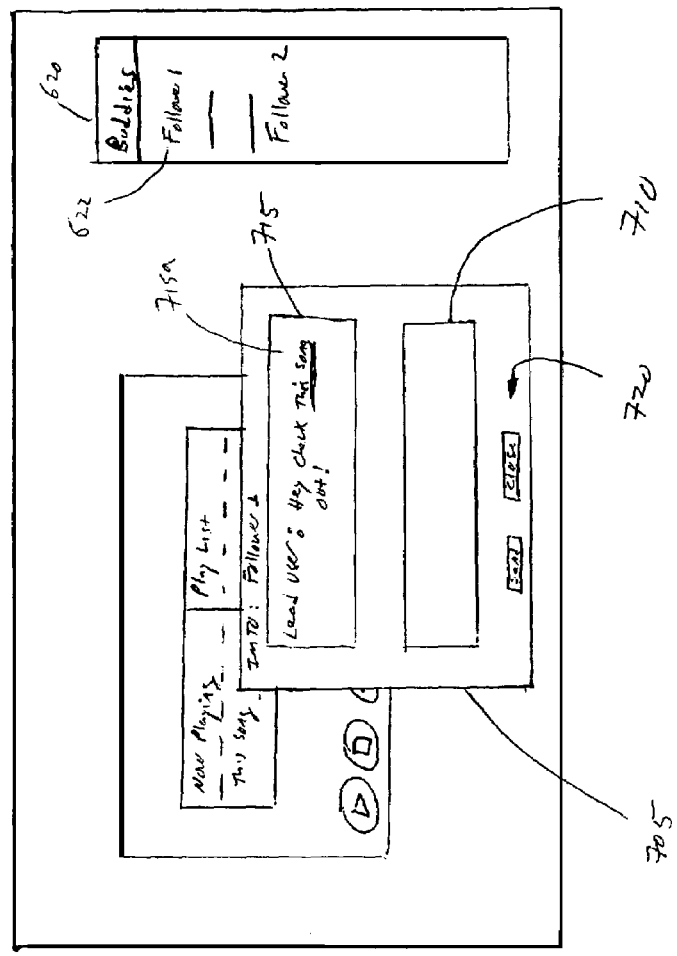

FIG. 7 illustrates one particular scenario for identifying followers to share the on-line media content experience of the lead user and for manually generating an invitation. As shown, FIG. 7 illustrates an example of a UI 700 for enabling a lead user to send an invitation for sharing an on-line media content experience to one or more followers. The lead user may invoke an IM UI 705 to send the invitation by instant message to a selected buddy Follower1 622 from the buddy list 620. A similar invitation may be sent to other followers. The IM UI 705 includes a compose area 710 where the lead user may compose an instant message, a message history area 715 containing a log of instant messages sent and received, and controls 720 for sending an instant message. In the example of FIG. 7, the lead user has composed a personalized invitation 715a containing a link to the on-line media content experience that the lead user desires to share.

As shown in FIG. 7, the lead user may select a follower 622 with whom to share on-line media content from among other followers on an IM buddy list 620. In another implementation, the identification is made automatically. For example, the identification may be made based on a matching between the content and a list of followers with whom the lead user desires to share content. For instance, a follower may be associated with one or more categories of desired content, and the matching process may be performed with the follower based on the category of the on-line media content. The identification may account for the availability of the follower, as provided in step 510. For example, if the invitation is to be sent by IM, the identification may result in selection of those followers who are on-line. In one implementation, the identification may be made by a host system 110.

Thereafter, the identified followers are invited to share the on-line media content experience of the lead user (step 525). In one implementation, the invitation is sent manually. In another implementation, the invitation is generated automatically for the follower identified by step 520. The invitation may be automatically generated by the lead user system 305A or by the host system 110.

The invitation may be personalized for each follower, and the personalization may be done manually or automatically. The invitation typically contains a link, such as a URL or other identifier, that allows a follower to access and experience the on-line media content experienced by the lead user. The invitation may also contain a flag or other mechanism that allows the follower system 305B to process the invitation automatically, without user intervention by the follower. A suitable communication method may be used to send the invitation to the follower. Examples of possible communications methods include IM, chat, and e-mail.

FIG. 7 shows one example of manually generating an invitation. In particular, the lead user may generate an instant message to a follower by invoking an IM user interface (UI) 705, manually selecting a buddy 622 from a buddy list 620, and sending a message 715a including a link to the on-line media content 616 that the lead user desires to share.

Typically, steps 515-525 are automated collectively. However other implementations are possible. For example, content of interest may be automatically identified and the followers to invite automatically identified, however, the lead user may be given the option to manually generate the invitations.

After the invitation is generated, the host system 110 routes the invitation to the selected followers (step 530). In one implementation, the host system routes the invitation directly to the follower. In another implementation, the host system routes the invitation to one or more intermediaries that route the invitation to the follower. In yet another implementation, the lead user system 305A routes the invitation directly to the follower system 305B, without routing the invitation through the host system 110.

Next, the follower system 305B receives the invitation (step 535).

Figure 8:
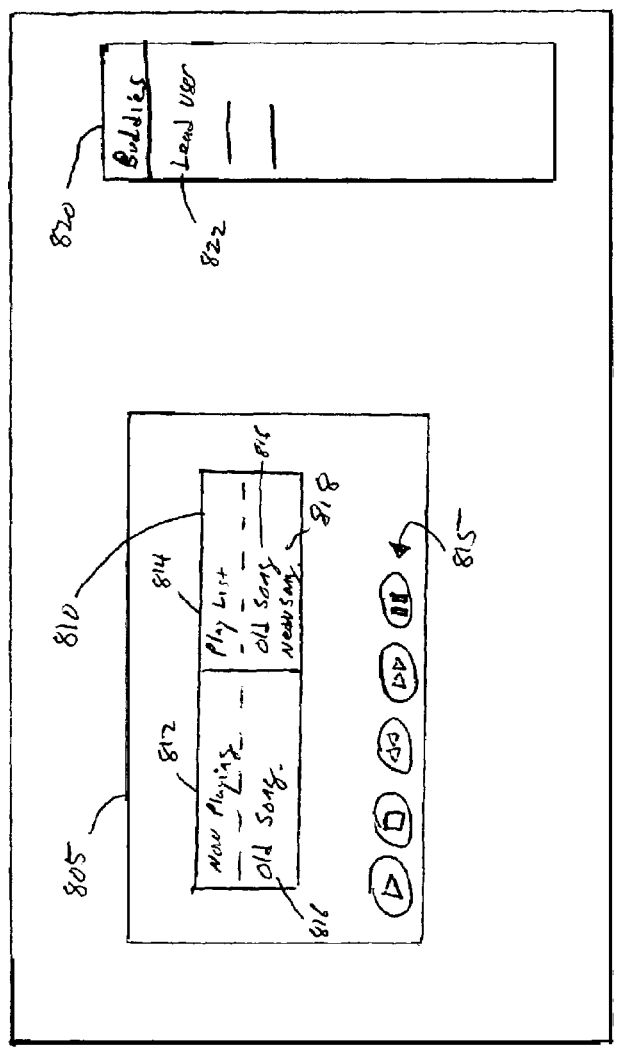

FIG. 8 illustrates one particular scenario in which the follower receives the invitation. In particular, FIG. 8 illustrates an example of a UI 800 that may be presented to a follower for enabling the follower to experience on-line media content. As with UT 600 discussed above, the UT 800 includes a media player 805 configured to access the on-line media content and make it perceivable to the follower. In general, the UT 800 is rendered on the follower system 305B using software stored on the follower system 305B.

As shown, the media player 805 includes a window 810 that displays the on-line media content currently being experienced 812 and a play list of media content 814 that may include content previously experienced, content currently being experienced, and content scheduled to be experienced in the future. In the example of FIG. 8, the media content currently being experienced 812 is a song 816, and the play list includes the song 816 currently being experienced and a different song 818 scheduled to be experienced next. The media play 805 also includes controls 815 for enabling the follower to control the experience of the on-line content, such as controls for starting, stopping, fast forwarding, and rewinding the content.

The UI 800 also includes a list of other users 820, including lead user 822, with which the follower may wish to share on-line media content experiences. As shown, the list of users 820 is a buddy list in an instant messaging context, and shows at least lead user 822 is currently on-line.

The invitation is processed (step 540), for instance, by accepting or rejecting the invitation. The processing may be done manually or automatically, by the follower system without explicit follower intervention or by the follower through their interaction. For instance, in one implementation, as discussed with respect to FIGS. 9 and 10, the invitation may be manually accepted by selection of the provided link to on-line media content. Rejection of the invitation results in no change to the on-line content being experienced by the user, as shown, for example, in FIG. 8.

In another implementation, the processing may be done automatically, and may be based upon a set of pre-defined rules. For example, a follower may authorize an invitation from the lead user to be automatically accepted, or automatically rejected, without requiring intervention by the follower. A flag or other indicator contained within the invitation may assist in the automatic processing of the invitation.

Figure 9:
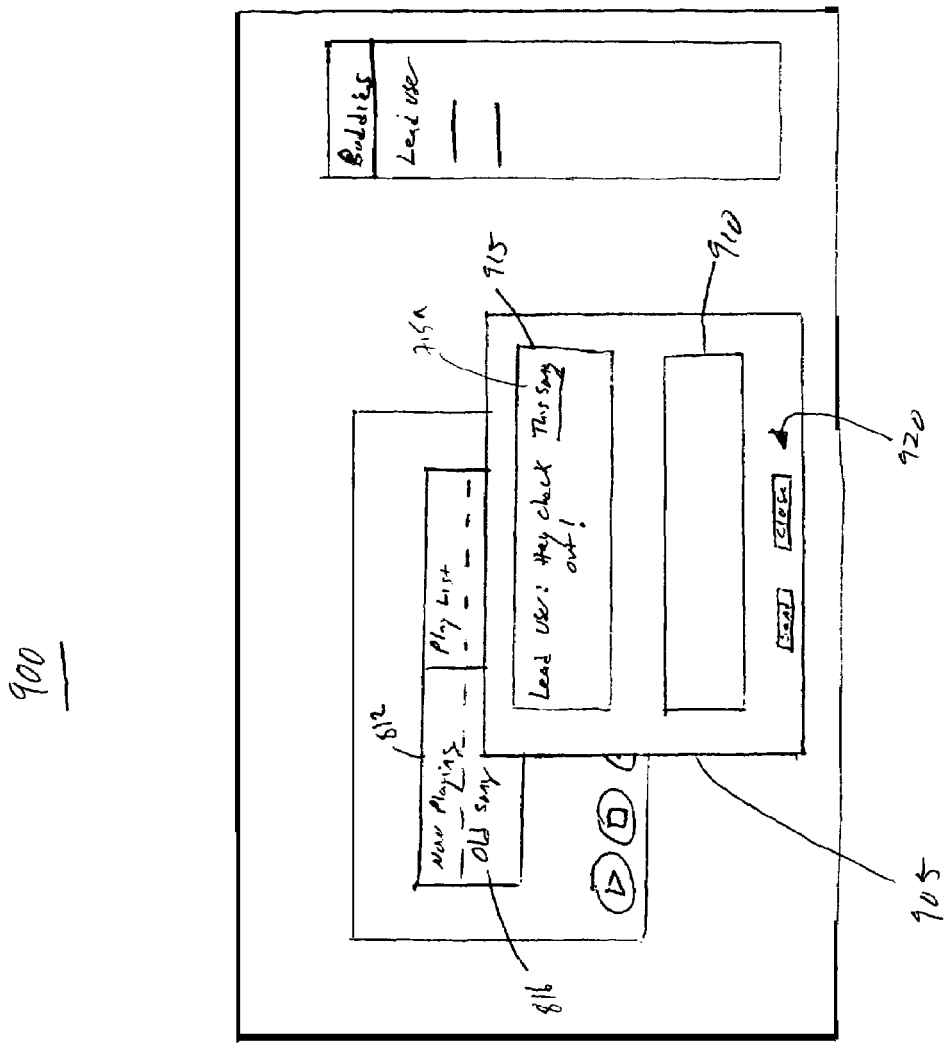
Figure 10:
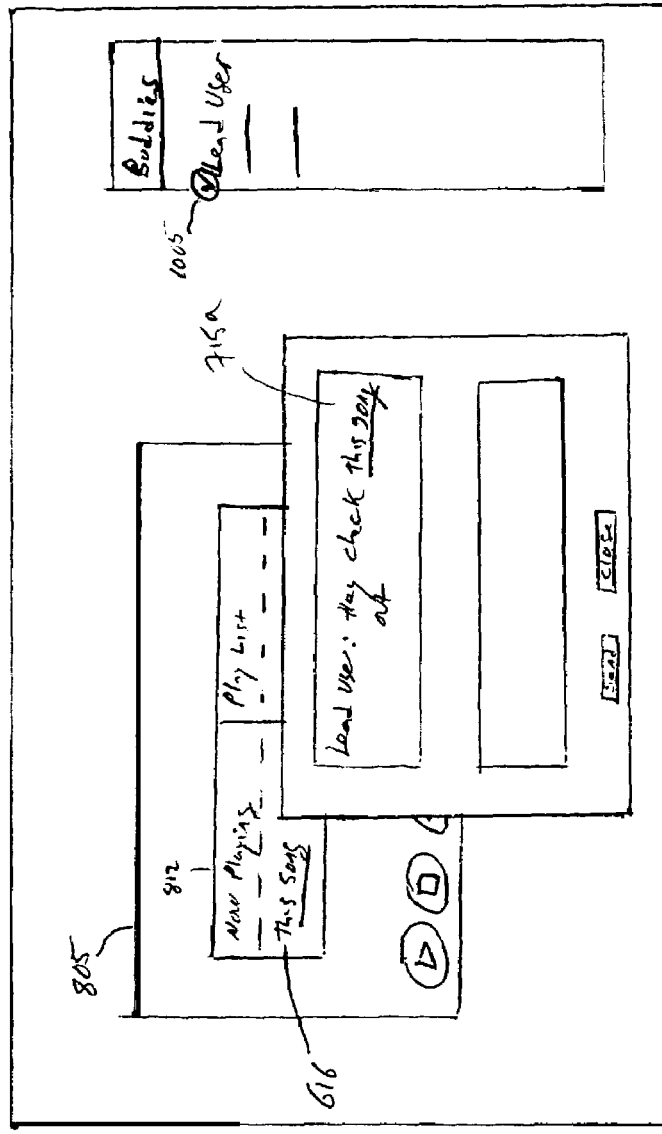

FIGS. 9 and 10 illustrate examples of UIs 900 and 1000 for enabling a follower to process an invitation for sharing an on-line media content experience with a lead user. As shown in FIG. 9, an IM UI 905 may be invoked on the follower system in response to an instant message invitation 715a received from the lead user. The IM UI 905 includes a compose area 910 where the follower may compose an instant message to send to the lead user, a message history area 915 containing a log of instant messages sent and received, and controls 920 for sending an instant message or otherwise accepting the invitation (not shown). In the example of FIG. 9, the lead user has composed a personalized invitation 715a containing a link to the on-line media content experience that the lead user desires to share with the follower. To accept the invitation, the follower may click on the link contained in the invitation 715a.

Referring to FIG. 10, the follower may accept an instant message invitation 715a received from the lead user by clicking on the link contained in the invitation 715a. After accepting the invitation, the media player 805 locates and plays the on-line media content 616 contained in the link, so that the follower is able to share the on-line media content experience of the lead user. When the follower shares the on-line media content experience of the lead user, a sharing status report may be generated and a symbol 1005 may appear in the follower's buddy list to indicate that the follower is sharing the on-line media content experience of the lead user.

The follower is not necessarily notified of the receipt of the invitation. For example, as discussed with respect to step 535 of FIG. 9, if the invitation is sent by IM, the follower may not be notified, whether by application design or follower choice, to be notified of the receipt of the invitation.

A determination is made as to whether the invitation has been accepted or rejected (step 542). If the invitation has been accepted, then the on-line content is accessed for the shared experience (step 545). The content may be accessed using the URL or other identifier associated with the content. Accessing the content may include automatically changing the on-line content being perceived by the follower. For example, as shown in FIGS. 8 and 9, until the invitation is accepted, the follower is perceiving certain content selected by the follower, which in this example is a song 816. As shown in FIGS. 8 and 10, when the invitation is accepted, the content being perceived by the follower automatically changes from the old content 816 of FIG. 8 to the new content 616 of FIG. 10 selected by the lead user, which in this case is a different song 616. However, the new content may include other new content selected by the lead user, such as a video segment or a picture.

When the invitation is either accepted or rejected, a sharing status report is generated to indicate the acceptance or rejection of the invitation by the follower (step 550). The results of the sharing status report may be displayed to the lead user and/or to the follower. The sharing status report may be updated as needed. For example, if the follower decides to cease sharing the on-line media experience of the lead user, an updated sharing status report may be generated to reflect the updated status. The sharing status report may include a visual identifier, such as the icon 1005 shown in FIG. 10, to indicate that the follower is sharing the on-line media experience of the lead user 822. In another implementation, the absence of an icon may indicate that the follower is sharing the on-line media experience of the lead user. A different icon, or no icon, may be provided if the follower is not sharing the on-line media experience of the lead user.

The sharing status report is routed to the lead user system 305A by the host system 110 (step 555). In one implementation, the host system routes the sharing status report directly to the lead user. In another implementation, the host system routes the sharing status report to one or more intermediaries, before the sharing status report is routed to the lead user. In yet another implementation, the follower system 305B may route the sharing status report directly to the lead user system 305A, without routing the report through the host system 110. In one implementation, the host stores the sharing status information for designated followers, and updates the sharing status for the designated followers.

Figure 11:
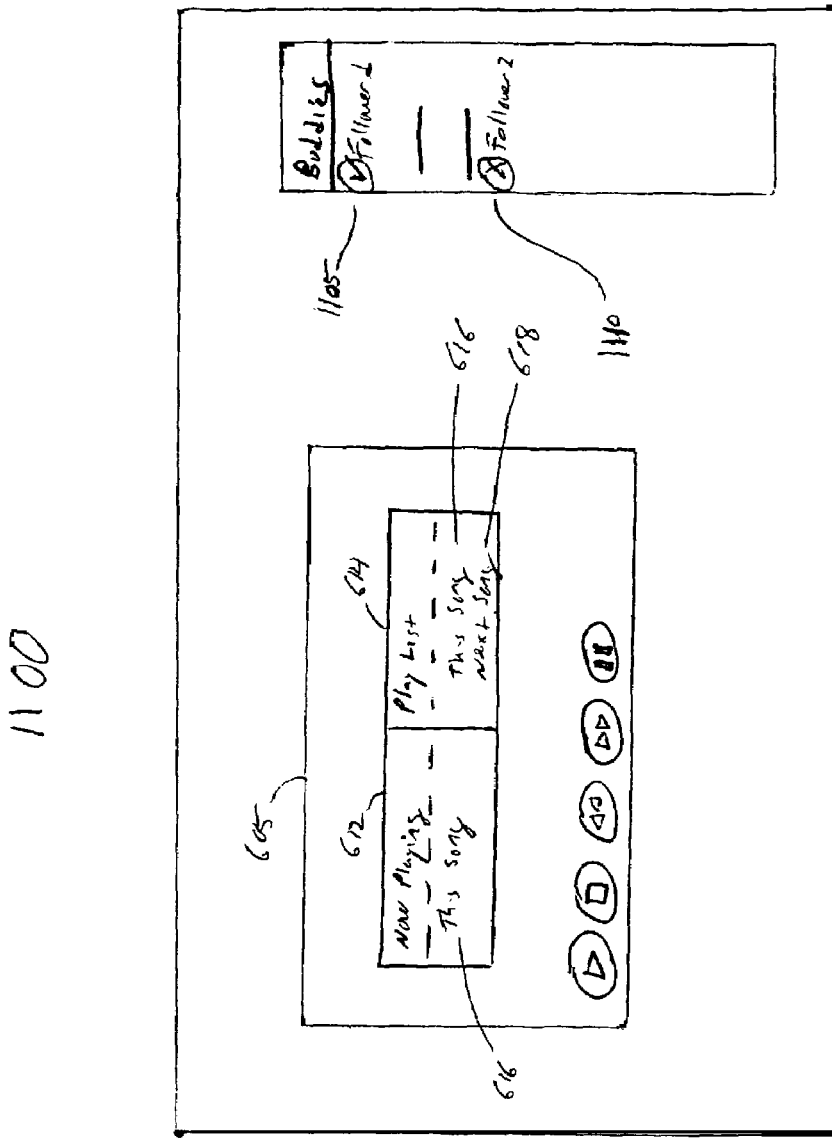

Finally, the lead user system 305A receives the sharing status report (step 560). One form of a sharing status report involves a UI presented to the lead user, as shown in FIG. 11. In particular, FIG. 11 illustrates an example of a user interface (UI) 1100 that may be presented to a lead user for displaying a sharing status report received from a follower. As shown, the media player 605 displays the on-line media content currently being experienced 612, which in this case is a song 616, and the play list 614 includes the song 616 currently being experienced and a different song 618 scheduled to be experienced next.

The UI 1100 shows symbols 1105 and 1110 indicating the receipt of a sharing status report from the two buddies. In particular, a symbol 1105 indicates that buddy Follower1 is sharing the on-line media experience of the lead user and a symbol 1110 that buddy Follower2 624 is not sharing the on-line media experience of the lead user. The symbol 1110 may be generated, for example, upon receipt of a sharing status report indicating that Follower2 has rejected the invitation or update for sharing on-line media content, or upon receipt of an indication that Follower2 has ceased sharing the on-line media content experience of the lead user.

In other implementations, the absence of an icon may indicate that the follower is sharing (or not sharing) the on-line media experience of the lead user. Other forms of a sharing status report may be provided. For example, a sharing report may be generated by a Java-invoked page of a web browser or by an e-mail message.

FIG. 12 shows one implementation of an update process where the on-line media content being experienced by the lead user changes and the updated content is shared with one or more followers. Referring to FIG. 12, in procedure 1200, on-line media content of interest being played or otherwise being made perceptible on the lead user system 305A is identified and reported to the host system 110 (515).

Figure 13:
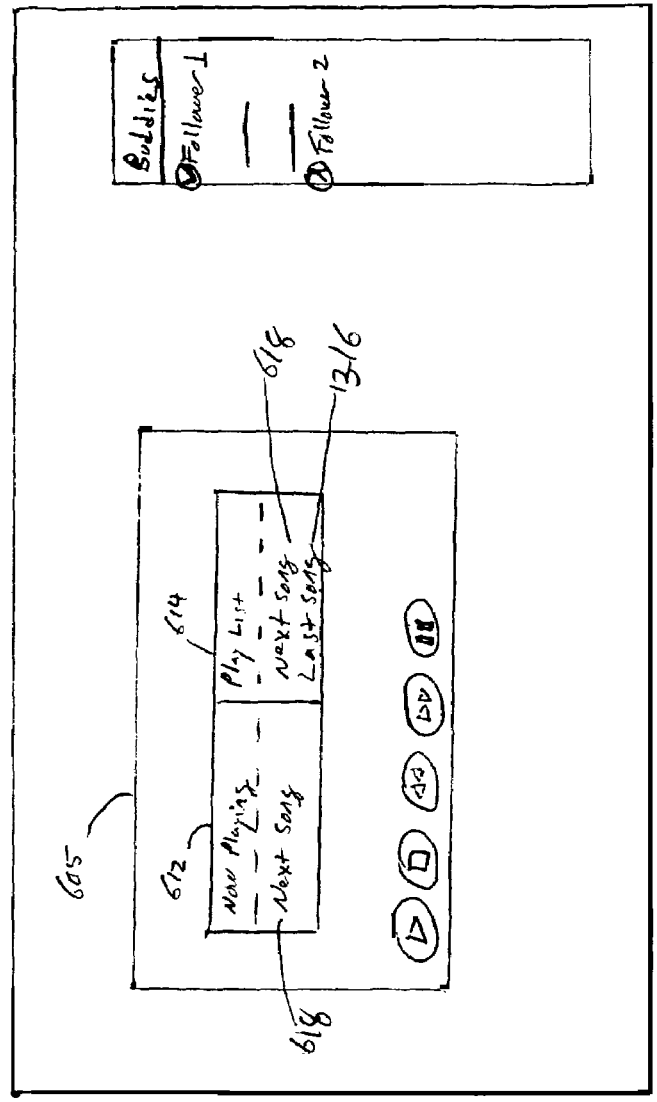

Next, a determination is made as to whether there has been a change in content being experienced by the lead user (step 1262). For example, as shown by FIGS. 11 and 13, there may be a change by the lead user in the playing of a song 616 by a media player 605 running on the lead user system to a different song 618 played by the media player 605, with a different song 1316 being scheduled to be experienced next. In another example, the user may change from playing a song 618 on the media player 605 to playing a video clip on a different media player. A change in content may also include stopping play, pausing play, fast forwarding, or rewinding of the media content. If no change in content is identified, the identification process of step 515 may continue until a change is identified. In one implementation, the determination is made by the lead user system 305A. In another implementation, the determination is made by the host system 110.

Because various aspects of steps 1264-1280 of procedure 1200 are similar to those discussed above with respect to steps 520-560 of procedure 500, the following discussion of steps 1264-1280 is somewhat abbreviated.

If a change in content is identified in step 1262, an identification is made, from a list of followers, as to which followers will be selected to update the on-line media content experience of the lead user (step 1264). The identification is made in a manner similar to that described with respect to step 520. In one implementation, the identification is made by the lead user system 305A. In another implementation, the identification is made by the host system 110. The results of the identification may include inviting new followers who would not have been interested in the previous content but may be interested in the updated content, and terminating the shared experience for other followers who may not be interested in the updated content but who were interested in the previous content. In another implementation, the sharing process may not be terminated by the lead user system once the process begins. New followers may be added as described with respect to FIG. 5.

Next, an update is generated to the identified followers to update their sharing of the on-line media content experience of the lead user (step 1266). The generation of the update is similar to the generation of the invitation, as described with respect to step 525. The update may be done automatically, without displaying a UI as shown in FIG. 7. In one implementation, the update is generated by the lead user system 305A. In another implementation, the update is generated by the host system 110.

After the update is generated, the host system 110 routes the update to the selected followers (step 1268) in a manner similar to that described with respect to step 530. In another implementation, the lead user system 305A routes the update directly to the follower without routing the update through the host system 110.

Next, the follower system 305B receives the update (step 1270) in a manner similar to that described with respect to step 535. Typically, the follower is not notified concerning receipt of the update.

The update is then processed (step 1272) in a manner similar to that described with respect to step 540. Typically, the processing of the update is done automatically. A flag or other indicator may be contained within the update to indicate that automatic processing is to be used. For example, a flag may be embedded within an instant message to indicate to the follower system 305B that an updated link to shared on-line content is provided within the message, and that a media player needs to be automatically updated with the new link to on-line content so that the shared experience may continue.

A determination is made as to whether the update has been accepted or rejected (step 1273) in a manner similar to that of step 542. In one implementation, the determination is made by the follower system 305B. In another implementation, the determination is made by the host system 110.

If the update has been accepted, then the updated on-line content is accessed for the shared experience (step 1274) in a manner similar to that of step 545. The updated content for the shared experience may be accessed using the URL or another identifier associated with the content. For example, as shown in FIG. 14, until the update is accepted, the follower is experiencing certain content selected, which in this example is a song 616.

Figure 14:
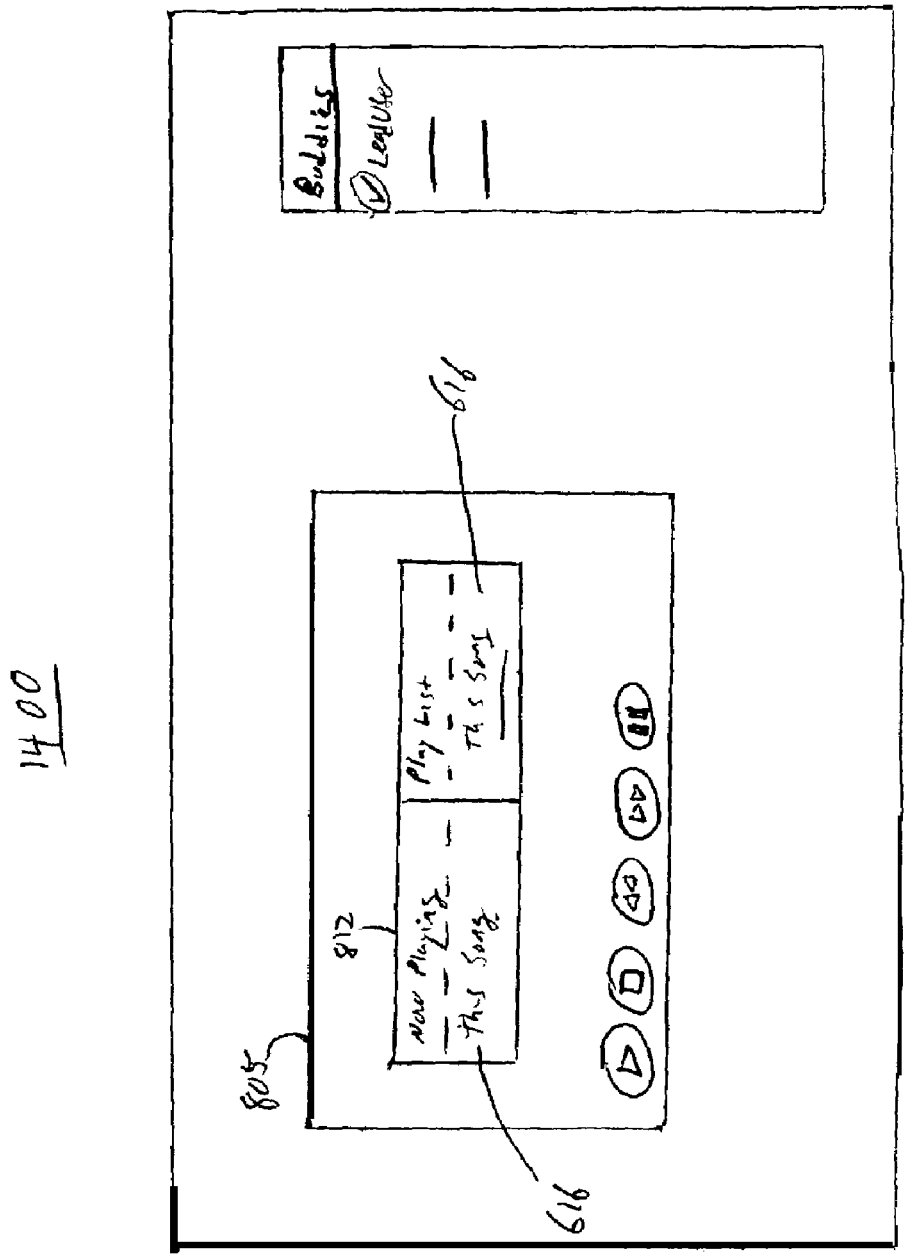

FIG. 14 illustrates an example of a UI 1400 that may be presented to a follower prior to accepting an update. As shown, the media content currently being experienced 812 is a song 616 experienced by the lead user prior to the update, and the play list includes the song 616 currently being experienced. The play list also may include other songs previously experienced or scheduled to be experienced by the lead user.

FIG. 15 illustrates an example of a UI 1500 that may be presented to a follower after accepting an update. Similarly to UI 800 and UI 1400, the UI 1500 includes a media player 805 configured to access the on-line media content and make it perceivable to the follower. As shown, the media content currently being experienced 812 is a song 618 currently being experienced by the lead user, and the play list includes the song 618 currently being experienced. The song 618 currently being experienced is different from the song 616 previously experienced and shown with respect to FIG. 14.

As shown in FIG. 15, when the update is accepted, the content being experienced by the follower automatically changes from the old content 616 to the new content 618 selected by the lead user, which in this case is a different song 618. However, the new content may be other new content selected by the lead user, such as a video segment or a picture.

When the update is either accepted or rejected, a sharing status report may be generated to indicate the acceptance or rejection of the update by the follower (step 1276). The report is similar to the sharing status report described with respect to step 550. In one implementation, the sharing status report is generated by the follower system 305B. In another implementation, the determination is made by the host system 110. The sharing status report is routed to the lead user system 305A by the host system 110 (step 1278) in a manner similar to that described with respect to step 555. In one implementation, the sharing status report is sent directly to the lead user system 305A without being routed through the hosts system 110. Finally, the lead user system 305A receives the sharing status report (step 1280), in a manner similar to that described with respect to step 560.

The relative order of steps 505-560 with respect to other steps in procedure 500, and the relative order of steps 1262-1280 with respect to other steps in procedure 1200, and also with respect to each other, may vary. For example, referring to FIG. 5, a sharing status report (step 550) may be generated before content is accessed for the shared experience (step 545). Also, certain steps may be omitted entirely, as appropriate. For example, referring to FIG. 5, step 510 may be eliminated and the decision to generate invitations may be made by the lead user without consideration of the on-line presence state of the follower. Also, as another example, steps 550-560 of FIG. 5 and steps 1276-1280 of FIG. 12 may be eliminated and no sharing status report may be generated or provided.

Other implementations are within the scope of the following claims.

The invention claimed is:

1. A computer implemented method for enabling a lead user to share an on-line media content experience with one or more followers, the method comprising:
   detecting multimedia content of interest presently being experienced by a lead user on a lead user system;
   identifying at least one property associated with the detected multimedia content of interest presently being experienced by the lead user on the lead user system;
   accessing a list of one or more followers associated with the lead user;
   accessing, from electronic storage, information related to interests of one or more followers included on the accessed list;
   comparing the at least one property associated with the detected multimedia content of interest presently being experienced by the lead user on the lead user system with the information related to the interests of one or more followers included on the accessed list;
   based on comparison results:
      determining whether or not to share the detected multimedia content of interest presently being experienced by the lead user on the lead user system with one or more followers included on the accessed list, and
      identifying one or more followers included on the accessed list with whom to share the multimedia content of interest presently being experienced by the lead user on the lead user system conditioned on determining to share the detected multimedia content of interest presently being experienced by the lead user on the lead user system with one or more followers included on the accessed list;
   inviting the identified followers to experience the multimedia content of interest presently being experienced by the lead user on the lead user system; and
   enabling the identified followers to access the multimedia content of interest presently being experienced by the lead user on the lead user system.

2. The method of claim 1 wherein detecting the multimedia content of interest comprises detecting media content being streamed to the lead user system.

3. The method of claim 1 wherein detecting the multimedia content of interest comprises automatically detecting the multimedia content at the lead user system.

4. The method of claim 1 wherein detecting the multimedia content of interest comprises receiving an indication that multimedia content of interest is being experienced by the lead user on the lead user system.

5. The method of claim 1 wherein identifying one or more followers comprises selecting, without human intervention, the one or more followers from the accessed list based on comparison results.

6. The method of claim 5 wherein selecting, without human intervention, the one or more followers comprises selecting the one or more followers based on an electronic matching between the at least one property of the multimedia content and an interest of the follower.

7. The method of claim 5 wherein selecting the one or more followers comprises selecting the one or more followers at the lead user system.

8. The method of claim 5 wherein selecting the one or more followers comprises selecting the one or more followers by a host system.

9. The method of claim 1 wherein inviting comprises generating a personalized invitation for one or more of the followers.

10. The method of claim 1 wherein inviting comprises automatically generating an invitation at the lead user system.

11. The method of claim 1 wherein inviting comprises automatically generating an invitation by a host system.

12. The method of claim 1 further comprising sending an invitation using one of an instant message, a chat room, and an e-mail message.

13. The method of claim 1 further comprising sending an invitation without user intervention in a machine-to-machine communication.

14. The method of claim 1 wherein enabling the identified followers to access the multimedia content of interest presently being experienced by the lead user on the lead user system includes:
   receiving an indication of acceptance of an invitation by the identified followers, and
   enabling the identified followers to access the multimedia content of interest presently being experienced by the lead user on the lead user system conditioned on receipt of the indication of acceptance of the invitation by the identified followers.

15. The method of claim 1 wherein enabling the followers to access the multimedia content of interest comprises enabling the followers to access the multimedia content of interest automatically based upon a machine-to-machine communication without intervention by a follower.

16. The method of claim 1 wherein the multimedia content of interest presently being experienced by the lead user includes an on-line media experience of the lead user, further comprising providing an indication to the lead user of whether the followers are experiencing the on-line media experience of the lead user.

17. The method of claim 1 the multimedia content of interest presently being experienced by the lead user includes an on-line media experience of the lead user, further comprising providing an indication to the follower of whether the follower is sharing the on-line media experience of the lead user.

18. The method of claim 1 wherein the identified followers include a first group of identified followers, further comprising:
   identifying a change in multimedia content of interest being experienced by the lead user on the lead user system;
   identifying a second group of one or more followers with whom to share the changed multimedia content of interest, the second group of identified followers being different than the first group of identified followers; and
enabling the second group of identified followers to access the changed multimedia content of interest.

19. The method of claim 18 wherein identifying the change in multimedia content of interest comprises having the lead user system automatically detect the change in multimedia content.

20. The method of claim 18 wherein identifying the change in multimedia content of interest comprises receiving an indication that changed multimedia content of interest is being experienced by the lead user on the lead user system.

21. The method of claim 18 wherein identifying the change in multimedia content of interest comprises having a host system automatically identify the change in multimedia content.

22. The method of claim 18 wherein identifying the second group of one or more followers comprises:
    identifying at least one property associated with the changed multimedia content of interest, at least one property associated with the changed multimedia content of interest being different than at least one property associated with the multimedia content of interest being experienced prior to the change;
    comparing the at least one property associated with the changed multimedia content of interest with the information related to the interests of one or more followers included on the accessed list of one or more followers associated with the lead user; and
    identifying the second group of one or more followers based on results of the comparison between at least one property associated with the changed multimedia content and interests of the second group of one or more followers.

23. The method of claim 18 wherein identifying the second group of one or more followers comprises having the lead user system determine the second group of one or more followers.

24. The method of claim 18 wherein identifying the second group of one or more followers comprises having the host system determine the second group of one or more followers.

25. The method of claim 18 wherein enabling the second group of identified followers to access the changed multimedia content of interest comprises enabling the second group of identified followers to automatically access the changed multimedia content based upon a machine-to-machine communication without intervention by a follower.

26. The method of claim 18 further comprising providing an indication to the lead user of whether the second group of identified followers are experiencing an updated on-line media experience of the lead user.

27. The method of claim 18 further comprising providing an indication to an updated follower included in the second group of identified followers of whether the updated follower is sharing an updated on-line media experience of the lead user.

28. The method of claim 1, wherein the at least one property reveals a category to be associated with the detected multimedia content of interest presently being experienced by the lead user on the lead user system.

29. The method of claim 28, wherein the information related to interests of one or more followers included on the accessed list includes categories of multimedia content with which the one or more followers included on the accessed list are interested.

30. The method of claim 29, wherein comparing the at least one property associated with the detected multimedia content of interest presently being experienced by the lead user on the lead user system with the information related to the interests of one or more followers included on the accessed list includes matching the category of the detected multimedia content of interest presently being experienced by the lead user on the lead user system with the categories of multimedia content with which the one or more followers included on the accessed list are interested.

31. The method of claim 1, wherein accessing information related to interests of one or more followers included on the accessed list includes accessing profile data for each of the followers included on the accessed list.

32. The method of claim 1, wherein the accessed list includes a list of one or more followers included on an instant messaging buddy list associated with the lead user.

33. The method of claim 32, wherein the list of one or more followers included on the instant messaging buddy list associated with the lead user includes a list of one or more followers included on the instant messaging buddy list associated with the lead user for which online presence has been detected.

34. The method of claim 1, wherein the accessed list includes a list of one or more followers associated with the lead user for which online presence has been detected.

35. The method of claim 1, wherein identifying at least one property associated with the detected multimedia content of interest presently being experienced by the lead user on the lead user system comprises identifying at least one characteristic of the detected multimedia content of interest presently being experienced by the lead user on the lead user system.

36. The method of claim 1, wherein accessing the list of one or more followers associated with the lead user comprises accessing the list of one or more followers associated with the lead user in response to detecting multimedia content of interest presently being experienced by the lead user on the lead user system.

37. The method of claim 1, wherein comparing the at least one property associated with the detected content of interest presently being experienced on the lead user system with the information related to the interests of one or more followers included on the accessed list includes comparing the at least one property associated with the detected content of interest presently being experienced on the lead user system with only information related to the one or more followers included on the accessed list.

38. The method of claim 1, wherein comparing the at least one property associated with the detected content of interest presently being experienced on the lead user system with the information related to the interests of one or more followers included on the accessed list includes comparing the at least one property associated with the detected content of interest presently being experienced on the lead user system with information related interests of only followers included on the accessed list.

39. The method of claim 1, wherein determining whether or not to share the detected content of interest presently being experienced on the lead user system with one or more followers included on the accessed list includes making a determination with respect to only followers included on the accessed list.

40. An article comprising a computer-readable storage medium having encoded thereon software for enabling a lead user to share an on-line media content experience with one or more followers, the software including instructions that, when executed by a computer, cause the computer to:

detect multimedia content of interest presently being experienced by a lead user on a lead user system;

identifying at least one property associated with the detected multimedia content of interest presently being experienced by the lead user on the lead user system;

access a list of one or more followers associated with the lead user;

access, from electronic storage, information related to interests of one or more followers included on the accessed list;

compare the at least one property associated with the detected multimedia content of interest presently being experienced by the lead user on the lead user system with the information related to the interests of one or more followers included on the accessed list;

based on comparison results:
determine whether or not to share the detected multimedia content of interest presently being experienced by the lead user on the lead user system with one or more followers included on the accessed list, and identify one or more followers included on the accessed list with whom to share the multimedia content of interest presently being experienced by the lead user on the lead user system conditioned on determining to share the detected multimedia content of interest presently being experienced by the lead user on the lead user system with one or more followers included on the accessed list;

invite the identified followers to experience the multimedia content of interest presently by the lead user on the lead user system; and enable the identified followers to access the multimedia content of interest presently being experienced by the lead user on the lead user system.

41. The article of claim 40 wherein instructions that, when executed by a computer, cause the computer to detect the multimedia content of interest comprise instructions that, when executed by a computer, cause the computer to detect media content being streamed to the lead user system.

42. The article of claim 40 wherein instructions that, when executed by a computer, cause the computer to detect the multimedia content of interest comprise instructions that, when executed by a computer, cause the computer to automatically detect the multimedia content at the lead user system.

43. The article of claim 40 wherein instructions that, when executed by a computer, cause the computer to detect multimedia content of interest comprise instructions that, when executed by a computer, cause the computer to receive an indication that multimedia content of interest is being experienced by the lead user on the lead user system.

44. The article of claim 40 wherein instructions that, when executed by a computer, cause the computer to identify one or more followers comprise instructions that, when executed by a computer, cause the computer to select, without human intervention, the one or more followers from the accessed list based on comparison results.

45. The article of claim 44 wherein instructions that, when executed by a computer, cause the computer to select the one or more followers comprise instructions that, when executed by a computer, cause the computer to select the one or more followers at the lead user system.

46. The article of claim 44 wherein instructions that, when executed by a computer, cause the computer to select the one or more followers comprise instructions that, when executed by a computer, cause the computer to select the one or more followers by a host system.

47. The article of claim 40 wherein instructions that, when executed by a computer, cause the computer to invite comprise instructions that, when executed by a computer, cause the computer to automatically generate an invitation at the lead user system.

48. The article of claim 40 wherein instructions that, when executed by a computer, cause the computer to invite comprise instructions that, when executed by a computer, cause the computer to automatically generate an invitation by a host system.

49. The article of claim 40 further comprising instructions that, when executed by a computer, cause the computer to send an invitation using one of an instant message, a chat room, and an e-mail message.

50. The article of claim 40 further comprising instructions that, when executed by a computer, cause the computer to send an invitation without user intervention in a machine-to-machine communication.

51. The article of claim 40 wherein instructions that, when executed by a computer, cause the computer to enable the followers to access the multimedia content of interest comprise instructions that, when executed by a computer, cause the computer to enable the followers to access the multimedia content of interest automatically based upon a machine-to-machine communication without intervention by a follower.

52. The article of claim 40 wherein the multimedia content of interest presently being experienced by the lead user includes an on-line media experience of the lead user, further comprising instructions that, when executed by a computer, cause the computer to provide an indication to the lead user of whether the followers are experiencing the on-line media experience of the lead user.

53. The article of claim 40 wherein the multimedia content of interest presently being experienced by the lead user includes an on-line media experience of the lead user, further comprising instructions that, when executed by a computer, cause the computer to provide an indication to the follower of whether the follower is sharing the on-line media experience of the lead user.

54. The article of claim 40 wherein the identified followers include a first group of identified followers, further comprising instructions that, when executed by a computer, cause the computer to:
identify a change in multimedia content of interest being experienced by the lead user on the lead user system;
identify a second group of one or more followers with whom to share the changed multimedia content of interest, the second group of identified followers being different than the first group of identified followers; and
enable the second group of identified followers to access the changed multimedia content of interest.

55. An electronic system comprising:
means for detecting multimedia content of interest presently being experienced by a lead user on a lead user system;
means for identifying at least one property associated with the detected multimedia content of interest presently being experienced by the lead user on the lead user system;
means for accessing a list of one or more followers associated with the lead user;
means for accessing, from electronic storage, information related to interests of one or more followers included on the accessed list;
means for comparing the at least one property associated with the detected multimedia content of interest presently being experienced by the lead user on the lead user system with the information related to the interests of one or more followers included on the accessed list;

means for, based on comparison results:
- determining whether or not to share the detected multimedia content of interest presently being experienced by the lead user on the lead user system with one or more followers included on the accessed list, and
- identifying one or more followers included on the accessed list with whom to share the multimedia content of interest presently being experienced by the lead user on the lead user system conditioned on determining to share the detected multimedia content of interest presently being experienced by the lead user on the lead user system with one or more followers included on the accessed list;

means for inviting the identified followers to experience the multimedia content of interest presently being experienced by the lead user on the lead user system; and means for enabling the identified followers to access the multimedia content of interest presently being experienced by the lead user on the lead user system.

56. The electronic system of claim 55 wherein means for identifying the multimedia content of interest comprises means for detecting media content being streamed to the lead user system.

57. The electronic system of claim 55 wherein means for identifying one or more followers comprises means for selecting, without human intervention, the one or more followers from the accessed list based on comparison results.

58. The electronic system of claim 55 further comprising means for sending an invitation using one of an instant message, a chat room, and an e-mail message.

59. The electronic system of claim 55 further comprising means for sending an invitation without user intervention in a machine-to-machine communication.

60. The electronic system of claim 55 wherein means for enabling the followers to access the multimedia content of interest comprises means for enabling the followers to access the multimedia content of interest automatically based upon a machine-to-machine communication without intervention by a follower.

61. The electronic system of claim 55 wherein the multimedia content of interest presently being experienced by the lead user includes an on-line media experience of the lead user, further comprising means for providing an indication to the lead user of whether the followers are experiencing the on-line media experience of the lead user.

62. The electronic system of claim 55 wherein the multimedia content of interest presently being experienced by the lead user includes an on-line media experience of the lead user, further comprising means for providing an indication to the follower of whether the follower is sharing the on-line media experience of the lead user.

63. The electronic system of claim 55 wherein the identified followers include a first group of identified followers, further comprising:
- means for identifying a change in multimedia content of interest being experienced by the lead user on the lead user system;
- means for identifying a second group of one or more followers with whom to share the changed multimedia content of interest, the second group of identified followers being different than the first group of identified followers; and
- means for enabling the second group of identified followers to access the changed multimedia content of interest.

* * * * *